United States Patent [19]

Seidel

[11] Patent Number: 4,576,624
[45] Date of Patent: Mar. 18, 1986

[54] MACHINE FOR FORMING HOLLOW ARTICLES OF VITREOUS MATERIAL

[75] Inventor: Hans-Georg Seidel, Rinteln, Fed. Rep. of Germany

[73] Assignee: Hermann Heye, Obernkirchen, Fed. Rep. of Germany

[21] Appl. No.: 275,238

[22] Filed: Jun. 19, 1981

[30] Foreign Application Priority Data

Jun. 28, 1980 [DE] Fed. Rep. of Germany ....... 3024428

[51] Int. Cl.$^4$ ............................ C03B 9/14; C03B 9/40
[52] U.S. Cl. ........................................ 65/300; 65/240; 65/264; 65/323; 65/361
[58] Field of Search ................. 65/323, 260, 361, 307, 65/240, 300, 359, 264, 261, 359, 241, 239; 425/525, 534

[56] References Cited

U.S. PATENT DOCUMENTS 3,206,296  9/1965  Mennitt ................................. 65/323
3,251,673  5/1966  Brymer .............................. 65/361 X
3,597,186  8/1971  Gossie et al. ...................... 65/264 X
3,803,877  4/1974  Becker .............................. 65/361 X
3,951,637  4/1976  Schaar .............................. 65/361 X Primary Examiner—Kenneth M. Schor
Attorney, Agent, or Firm—Michael J. Striker

[57] ABSTRACT

A machine for forming a hollow article of vitreous material has a neck mold having a neck ring with a pair of separable neck ring halves, a pair of holding elements each holding a respective one of the neck ring halves, a transporting element for transporting the neck molds along a predetermined path and having guiding bars, a driving element for moving each of the holding elements relative to the guide bars between closed and open end positions with locking of the same, and carriages displaceably mounted on the guide bars, wherein each of the holding elements for holding a respective one of the neck ring halves is releasably connected with one of the carriages.

12 Claims, 14 Drawing Figures

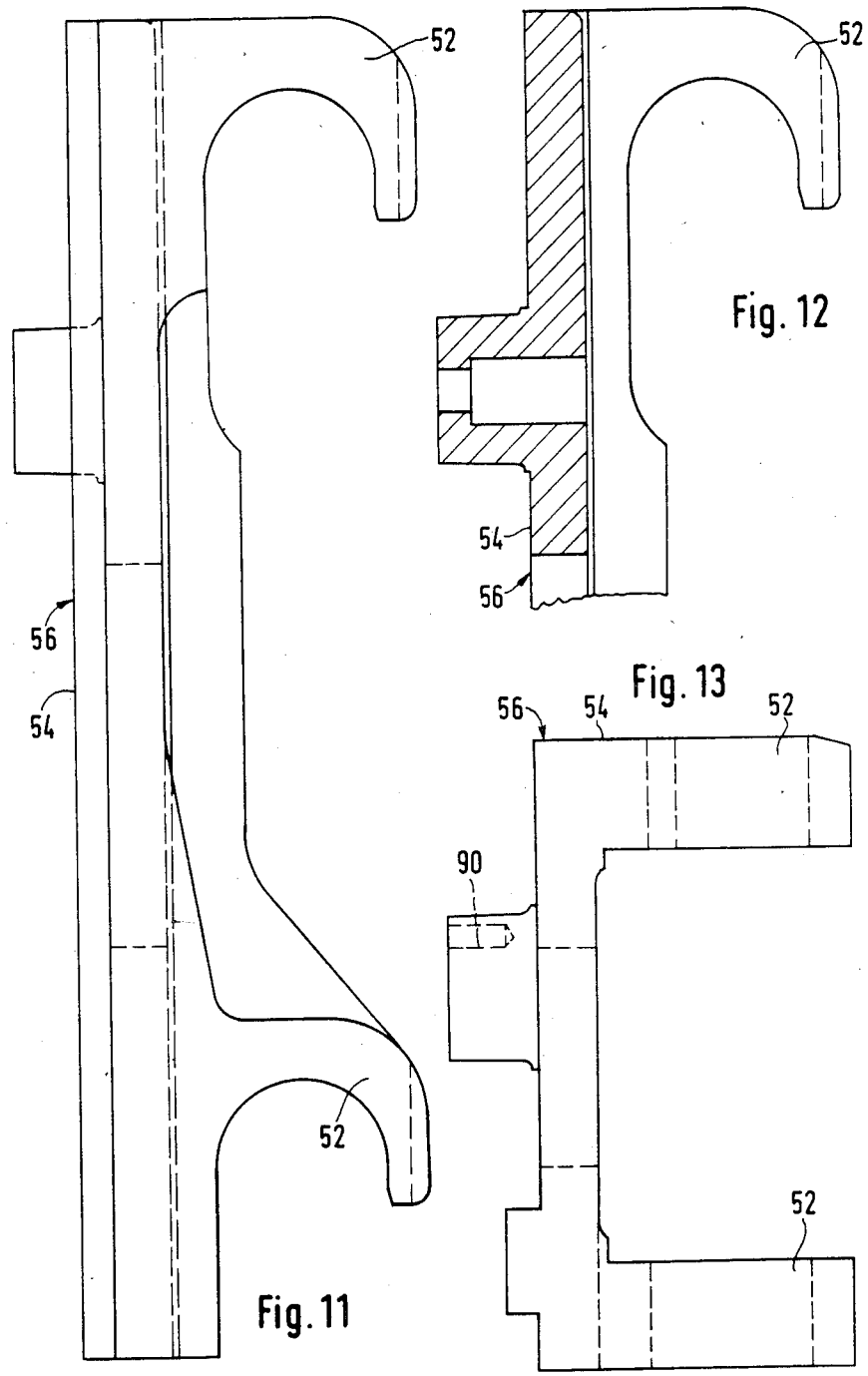

MACHINE FOR FORMING HOLLOW ARTICLES OF VITREOUS MATERIAL

BACKGROUND OF THE INVENTION

The present invention relates to a machine for forming articles of glass or similar thermoplastic materials. More particularly, it relates to a transport unit which transports along a predetermined path neck molds including neck rings each composed of two neck ring halves, wherein each neck ring half hangs on a holding element and each holding element displaces relative to guiding bars of a transport element by a drive element between closed and open end positions and locks by a locking mechanism in the end positions. Transport units of the abovementioned general type are known, for example, from the German Pat. No. 1,596,472 (FIGS. 7–16) and the German Auslegeschrift No. 1,704,112 (FIGS. 8–10) as well as in the corresponding U.S. Pat. Nos. 3,622,305 and 3,644,111. In this transport unit the holding elements are mounted displaceably directly on the guiding bars. Exchange, repair and maintenance of the holding elements and the neck molds are time consuming and lead to undesirable stopping of the machine.

SUMMARY OF THE INVENTION

Accordingly, it is an object of the present invention to provide a machine for forming hollow articles of vitreous material, which avoids the disadvantages of the prior art.

More particularly, it is an object of the present invention to provide a transport unit of a machine for forming hollow articles of vitreous material, which has improved construction and functions and allows to considerably eliminate the stopping time required for the transport units of the machine.

In keeping with these objects and with others which will become apparent hereinafter, one feature of the present invention resides in a machine having at least one forming means with a neck ring including a pair of separable neck ring halves, holding means including a pair of holding elements each holding a respective one of the neck ring halves, transporting means for transporting the forming means along a predetermined path and having guide bars, driving means for moving each of the holding elements relative to the guide bars between closed and open end positions, locking means for locking each of the holding elements in at least closed end position wherein each of the holding elements for holding a respective one of the neck ring halves is releasably connected with one of the carriages which are displaceably mounted on the guide bars.

When the machine is designed in accordance with the present invention, the holding elements can be removed from the carriages and hung on the carriages for adjustment, exchange, repair and maintenance operations. Thereby, these operations can be performed considerably easier and with considerably shorter time. The stoppages of the machine are respectively minimum. Each stoppage of the machine causes, in addition to production losses in the respective stations, also thermal problems. The machine becomes out of the thermal equilibrium which must be restored during a subsequent starting step, prior to performing of suitable machine operation. These disadvantages are eliminated in the machine designed in accordance with the present invention.

Another feature of the present invention resides in the fact that the drive means engage with the carriages. In such a construction the holding elements can be coupled with the carriages or uncoupled from the carriages in an especially easy and fast manner.

As especially simple and time economical uncoupling and coupling can be attained in accordance with still another feature of the present invention when each holding element hangs on the carriages with hooks and is fixed relative to the carriages by position determining means.

Yet another feature of the present invention is that the position determining means includes axial abutment shoulders formed on the carriages, and locking pins located between the holding elements and the carriages. For removing the holding elements, each of the locking pins is released by hand and the holding element is simply lifted from the carriage. In accordance with a further feature of the present invention, each holding element has a coupling part connectable with the guide bars and composed of a material with a relatively high strength and a holding part connectable with the coupling part. The coupling part can be formed, for example, of spheroidal graphite iron, whereas the holding part can be formed of an aluminum alloy. Thereby the coupling part which is subjected to relatively higher specific loading, particularly in the region of the coupling with the carriages, is reinforced for preventing deformation and other damages.

Still a further feature of the present invention is that each guide bar is supported in the central region of its length in a support of the transport element of the transporting means. Because of this "outer support" of the carriages, the transport unit has only mininum dimensions in direction of displacement of the holding elements. This is especially important for certain machines with relatively small free space.

An advantageous feature of the present invention which provides an especially good guidance with small dimensions resides in the fact that in accordance with the invention each carriage has a guide bush with which it slides on each guide bar.

Each of the carriages is urged by at least one closing spring to a position for closing the neck ring. It is thereby guaranteed that after insertion of the neck rings and adjustment of the machine, no holding elements can unintentionally move to open position and collide with other parts of the machine.

In accordance with an additional feature of the present invention, each of the closing springs is arranged between a support of the transport element of the transporting means and an adjacent one of the carriages, for example, concentrically with a respective one of the guide bars. Such a construction is cost economical for the case when each guide bar is held at each end of a support of the transport element.

In accordance with another embodiment of the invention, in the event of the abovementioned "outer support" of the carriages, each guide bar is tubular and receives in its inner space a closing spring which is connected with an outer end of the carriages. Thereby, only one closing spring is required at each guide bar and protected from outer influences.

In accordance with a further embodiment of the invention, the driving means includes a shaft supported in the transport element and having an axis and two axial end portions, a lever mounted on one end portion of the shaft and supporting a drive roller which is actuated a raisable and lowerable curved piece, a switch plate mounted on the other end portion of the shaft and having two switch pins which are symmetrical relative to the shaft axis, and a U-shaped bracket which is pivotally connected with each switch pin and with a respective one of the carriages with interposition of a spring element, wherein the brackets have arms which face toward one another and are telescopable in one another. Such a construction possesses very high safety in operation and allows the locking of the holding elements in the closed end position so that the brackets in a known manner (German Auslegeschrift No. 1,704,112, FIG. 9) during their closing movement over the connecting plane of the longitudinal axes of both switch pins outwardly pivot into one another.

In accordance with a further embodiment of the invention, each spring element of the respective bracket has a pin extending through a respective one of the brackets and having an eye supported on a respective one of the switch pins, and a spring member locked between each of the pins and the brackets and loading the latter with pulling force. The spring member may be formed as a plate spring package which provides for relatively high spring force in condition of short spring stroke, desirable for reliable locking of the carriages and thereby holding elements in their closed position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 11 is a side view taken along the line 11—11 in FIG. 10;

FIG. 12 is a view showing a section taken along the line 12—12 in FIG. 10;

FIG. 13 is a plan view taken along the line 13—13 in FIG. 10, however, turned by 90°.

DESCRIPTION OF THE PREFERRED EMBODIMENTS

Figure 1:
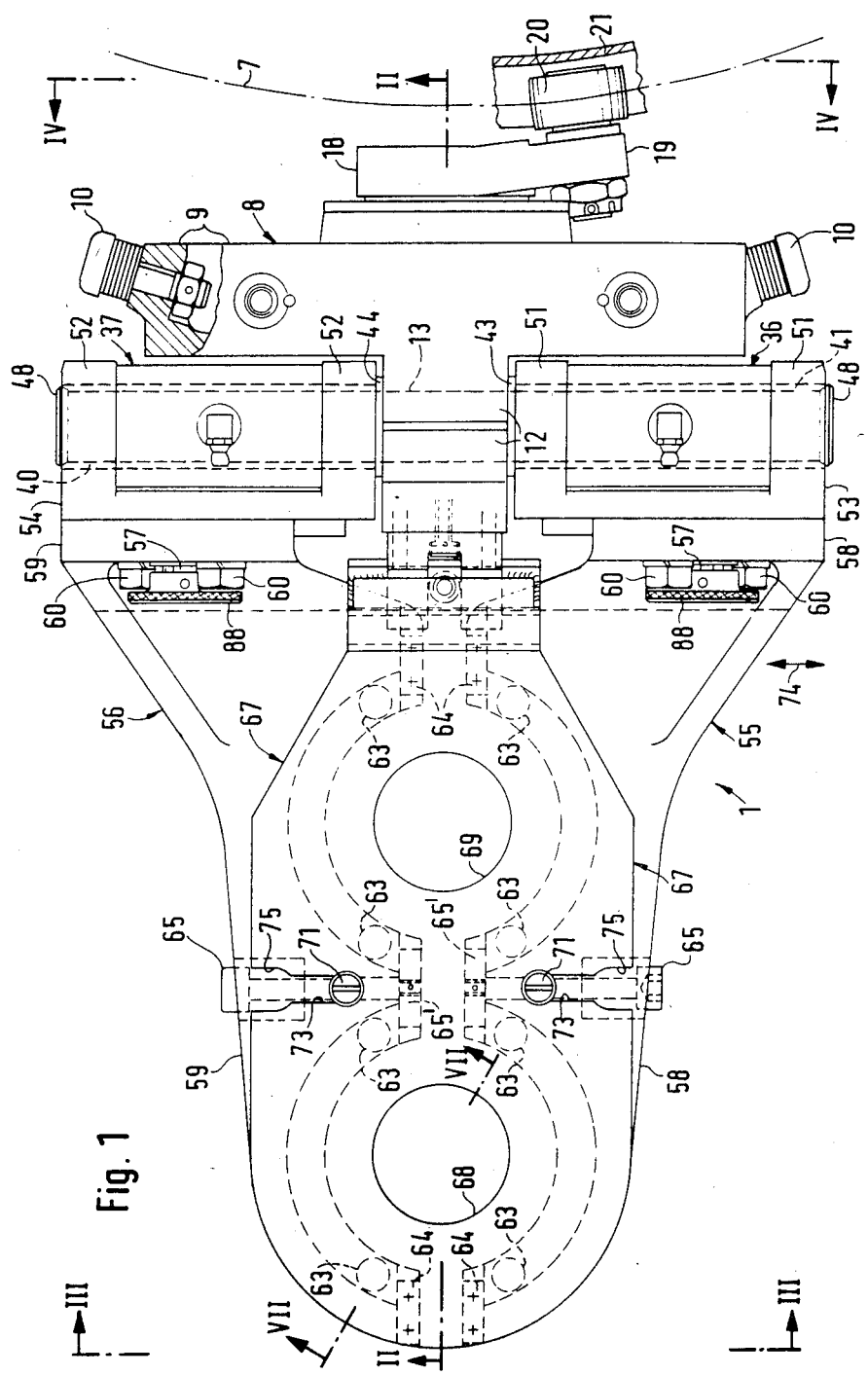
FIG. 1 is a plan view of a transport unit for a double neck mold of a machine for forming hollow articles of vitreous material, without neck molds.
Figure 2:
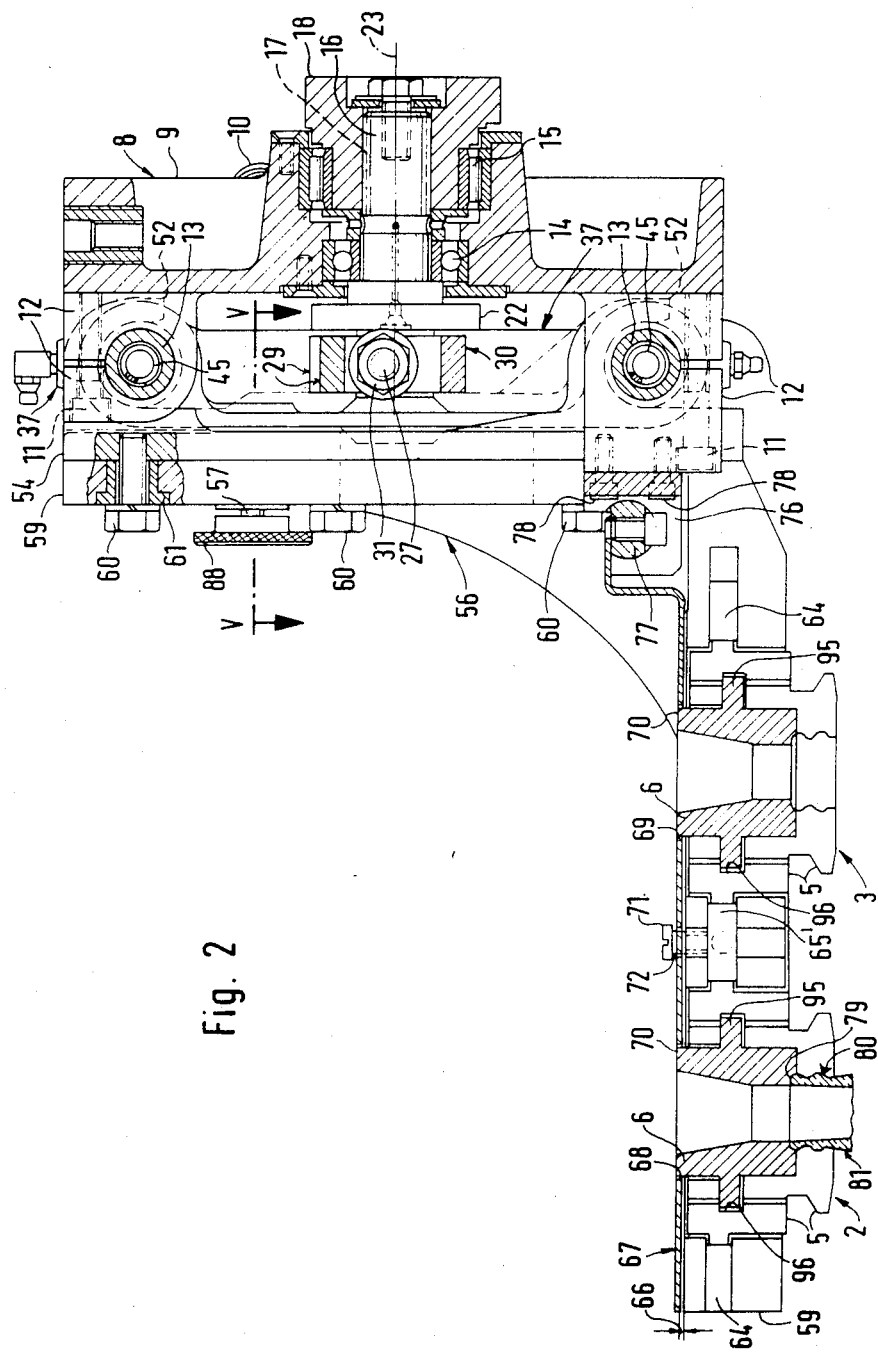
FIG. 2 is a view showing a section of the transport unit of FIG. 1, taken along the line 2—2 however with the inserted neck molds.
Figure 7:
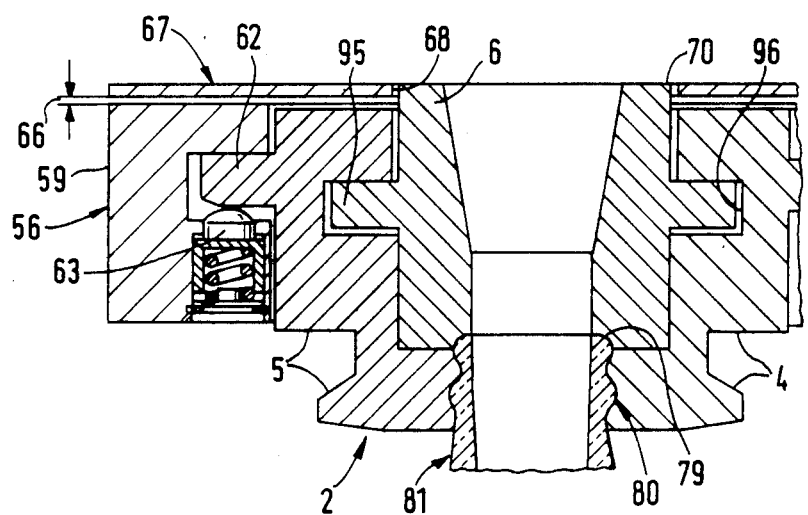
FIG. 7 is a view showing a section taken along the line 7—7 in FIG. 1 with the inserted neck mold.

FIG. 1 shows a transport unit 1 for two neck molds 2 and 3 each composed of two neck ring halves 4 and 5 and an integral guide ring 6 which hangs on the ring (see FIGS. 2 and 7). The transport unit 1 moves along a circular path 7, for example in a manner which is disclosed in the German Auslegeschrift No. 1,704,112.

A transport element 8 of the transport unit 1 is guided on a not shown transport arm of the abovementioned machine for forming hollow articles of vitreous material, along a circular path which is concentric with the path 7. A frame 9 of the transport element 8 has buffers 10 extending at both sides in the direction of the path so as to dampen eventual contact with the neighboring transport elements 8. In accordance with the abovementioned German Auslegeschrift No. 1,704,112 the individual transport units 1 of the machine move independently from one another along the path 7.

The frame 9 centrally carries supports 12 located above and below and clamped by screws 11. The supports 12 each fix a tubular guide bar 13 extending outwardly beyond both sides of the support.

As can be seen from FIG. 2, a shaft 16 is rotatably mounted in the frame 9 via roller bearings 14 and 15. The outer end of the shaft 16 carries, via a thread 17 a boss 18 of a lever 19, as can be seen from FIGS. 1 and 4. The free end of the lever 19 rotatably supports a drive roller 20. The drive roller 20 is actuated by a U-shaped curved piece 21 which can be raised and lowered by a lifting mechanism 21' (FIG. 4) formed, for example, as a double-acting cylinder-and-piston unit. The curved pieces 21 are to be provided only at locations of the path 7 at which the neck ring halves 4 and 5 must be opened. Generally, this takes place only in a removal station of the machine, in which the finished hollow articles are removed from the neck rings 2 and 3.

Figure 3:
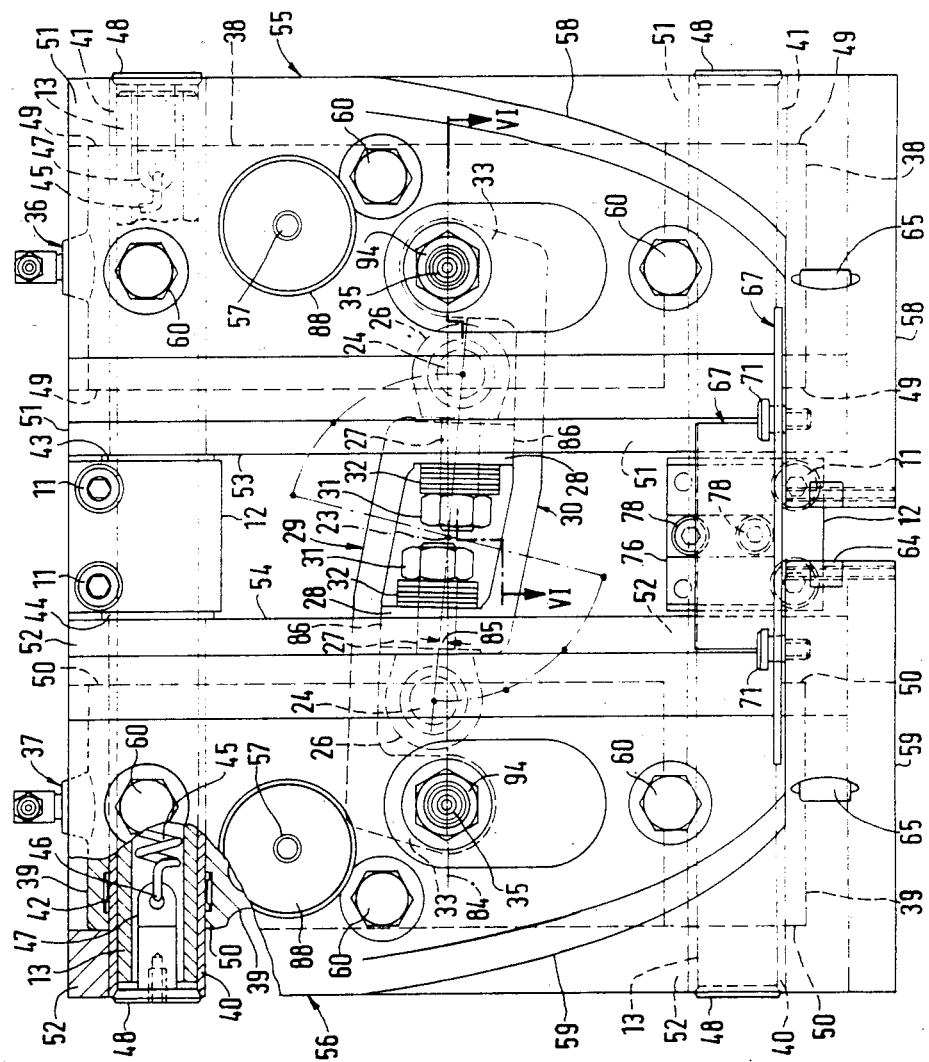
FIG. 3 is an end view taken along the line 3—3 in FIG. 1.
Figure 6:
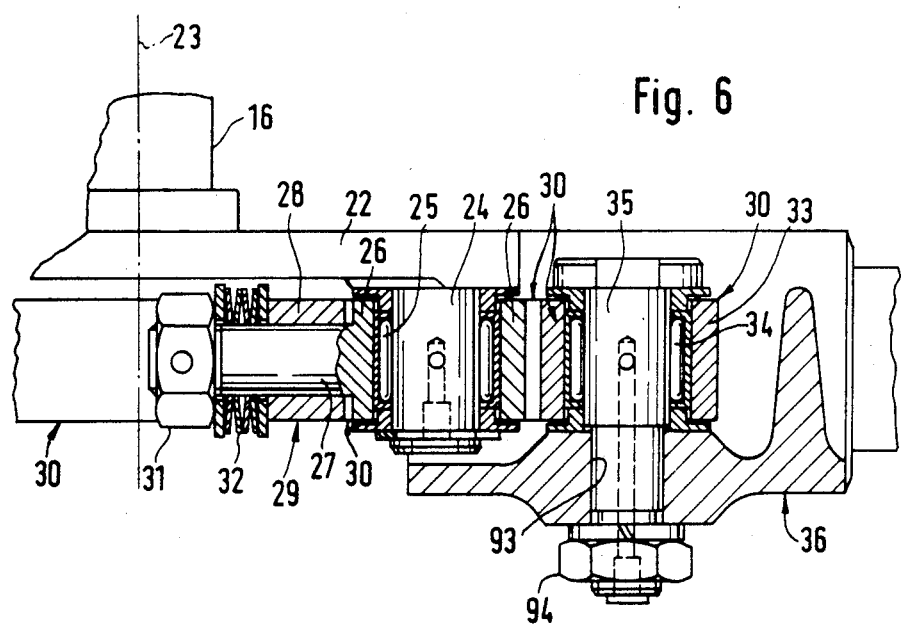
FIG. 6 is a view showing a section taken along the line 6—6 in FIG. 3.

A switching plate 22 is mounted at the other end of the shaft 16, and two switching pins 24 extend from the plate 22 to the left in FIG. 2 symmetrically to a longitudinal axis 23 of the shaft 16, as can be seen in FIGS. 3 and 6. An eye 26 of a pin 27 is supported on each switching pin 24 with a needle bearing 25. The pin 27 extends through one arm 28 of the a U-shaped bracket 29 or 30 and carries at its free threaded end a nut 31. A spring element 32 formed as a plate spring package is arranged between the nut 31 and the arm 28 so as to load the brackets 29 or 30 by pulling force.

Another arm 33 of each brackets 29 and 30 is supported on a pin 35 via a needle bearing 34 (FIG. 6), the pin being mounted on one of the carriages 36 and 37.

The carriages 36 and 37 carry frames 38 and 39, respectively. The frames 38 and 39 are displaceably supported with guide bushes 40 and 41 (FIG. 3) on both guide bars 13. The frames 38 and 39 and the guide bushes 40 and 41 are fixed relative to one another by a tolerance ring 42. Each guide bush 40, 41 is provided with an annular flange 43 and 44 which, in the closed position of the transport unit shown in FIGS. 1, 3 and 4 abuts against the associated supports 12 of the transport element 8 and thereby limits the closing stroke of the carriages 36 and 37.

The carriages 36 and 37 are prestressed to their closing position of FIG. 3 by two closing springs 45. Each spring is arranged in a respective one of the guide bars 13. Each closing spring 45 engages with an end hook 46 in an ear 47 which is mounted on a cover 48 supported on the outer end of the associated guide bush 40 and 41.

Each carriage 36, 37 has four abutment shoulders 49 and 50 which serve for determining an axial position of four hooks 51 and 52 of coupling parts 53 and 54 (FIG. 2) of holding elements 55 and 56, on the carriages 36 and 37. The coupling parts 53 and 54 are made of spheroidal graphite iron of high strength and hang with hooks 51 and 52 adjoining the abutment shoulders 49 and 50, on the guide bushes 40 and 41. For preventing dropping of the coupling part 53 and 54 from the carriages 36 and 37, each holding element 55, 56 is provided with a locking pin 57 which will be described in detail in connection with FIG. 5.

Each holding element 55, 56 has further a generally L-shaped holding part 58 and 59 which is mounted by three screws 60 (FIG. 2) on the coupling parts 53, 54. The holding parts 58, 59 are composed for weight economy of a suitable aluminum alloy. The screws 60 extend through a bush 61 located in the respective holding part 58, 59 with play in a vertical direction. This play allows a vertical adjustment of the holding parts 58, 59 relative to their coupling parts 53, 54 for tolerance compensation.

Since the transport unit 1 is used for a double job operation, each holding part 58, 59 carries two neck ring halves 4,4 or 5,5 of the neck molds 2, 3. Each neck ring half 4, 5 abuts (FIG. 7) with an outer flange 62 against two spring elements 63 (compare FIG. 1) which urge the neck molds 2, 3 to an upper end position in accordance with FIG. 7. Each neck ring 4, 5 is further fixed in circumferential direction by an immovable abutment piece 64 and an abutment piece 65' pivotal via a screw 65.

A centering arrangement 67 formed as a centering element is arranged in the region of the neck molds 2 and 3 at a small distance 66 (FIG. 2) above the holding parts 58 and 59. The centering arrangement has through-going openings 68 and 69 through which an outer portion 70 of each guide ring 6 extends and is guided in lateral direction. A screw 71 is screwed into each holding part 58 and 59 from above and has a head which holds the centering arrangement 67 in the operative position shown for example in FIG. 2. A shaft 72 of the screw 71 is movable in a slot 73 of the centering arrangement 67. The slot extends from an outer side of the centering arrangement 67 parallel to a displacement direction 74 of the holding elements 55 and 56, the displacement direction identified by the arrow in FIG. 1. The slot 73 has an outer enlargement 75 which allows passage of the head of the screw 71 when the holding elements 55 and 56 displace from one another and the centering arrangement 67 pivots upwardly about a pivot axle 77 mounted in a bearing 76. The bearing 76 is mounted by screws 78 (FIGS. 2 and 3) on the lower support 12 of the transport element 8. The pivot axle 77 cannot move in axial direction so that the neck molds 2 and 3 are centered.

FIG. 2 shows that the guide ring 6 forms an upper region 79 of a neck 80 of a hollow article 81, in this case a glass bottle. In the neck mold the hollow article is removed in FIG. 2 for the sake of clarity.

Figure 4:
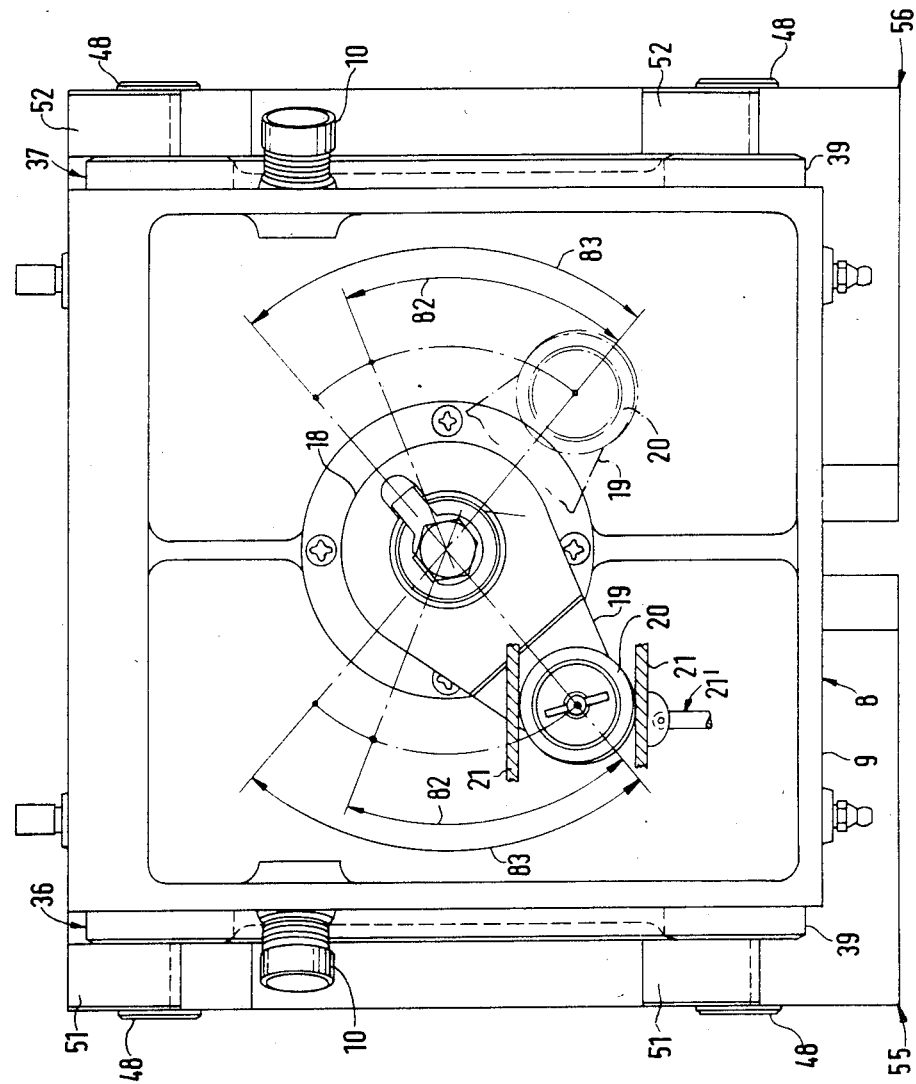
FIG. 4 is an end view taken along the line 4—4 in FIG. 1.

When the holding elements 55 and 56 must be moved from the closed position shown in FIGS. 3 and 4, to an open position, the curved piece 21 (FIGS. 1 and 4) is lifted by the lifting mechanism 21'. Thereby the drive roller 20 lifts and pivots the lever 19 in accordance with FIG. 4 in clockwise direction by an angle whose minimum value is identified in FIG. 4 by reference numeral 82 and maximum value is identified by reference numeral 83. The values of these pivot angles must be sufficient to release the neck 80 during opening of the neck ring halves 4 and 5, to thereby release the hollow article 81 from the neck molds 2 and 3.

The above mentioned pivoting of the lever 19 leads to pivoting of the switch pins 24, 24 by identical angles in counterclockwise direction, in accordance with FIG. 3. Thereby the brackets 29 and 30 are released from their opposite abutment position and drive the carriages 36 and 37 increasingly outwardly until the open end position of the holding elements 55 and 56 is attained. This opening movement takes place against the increasing closing force of both closing springs 45.

As soon as the curved piece 21 is again lowered the lever 19 pivots under the action of the upper arm of the curved piece 21 and the closing springs 45 again back to the closed position shown in FIG. 3, in which the holding elements 55 and 56 are locked. This locking is performed because the switching pins 24, 24 according to FIG. 3 pivot outwardly over a connecting plane 84 of the longitudinal axes of the pins 35 against the force of the spring elements 32, 32. The closing force of both closing springs 45 is not sufficient for this. The locking takes place rather because of the interengagement between the upper arm of the curved piece 21 and the drive roller 20. As can be seen from FIG. 3 the switching pins 24, 24 are pivoted in this locked closed end position by an angle 85 over the connecting plane 84. In the locked end position, the brackets 29 and 30 abut with an abutment face 86 against one another, and the annular flanges 43 and 44 of the carriages 36 and 37 abut against the upper and lower supports 12 of the frame 9 of the transport element 8.

Figure 5:
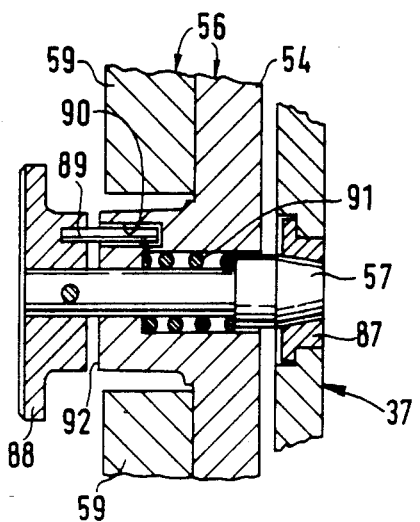
FIG. 5 is a view showing a section taken along the line 5—5 in FIG. 2.

As can be seen from FIG. 5, a conical end of the locking pin 57 engages in a complementary conical locking bush 87 which is inserted in a matching opening of the carriage 37. The locking pin 57 is provided at its other end with a hand knob 88 and a supporting pin 89 is mounted at its lower side. In the locked position of the locking pins 57 shown in FIG. 5, the supporting pin 89 engages in an opening 90 of the coupling part 54. When the hand knob 88 is pulled to the left in FIG. 5 against the force of a pressure spring 91 until the supporting pin 89 leaves the opening 90 and then pivots insignificantly about its longitudinal axis, the free end of the supporting pin 89 can be displaced on a supporting face 92 of the coupling part 54 to a position in which the locking pin 57 is located out of engagement with the locking bush 87. In this position the holding element 56 can be lifted from the carriage 37.

Figures 8, 9:
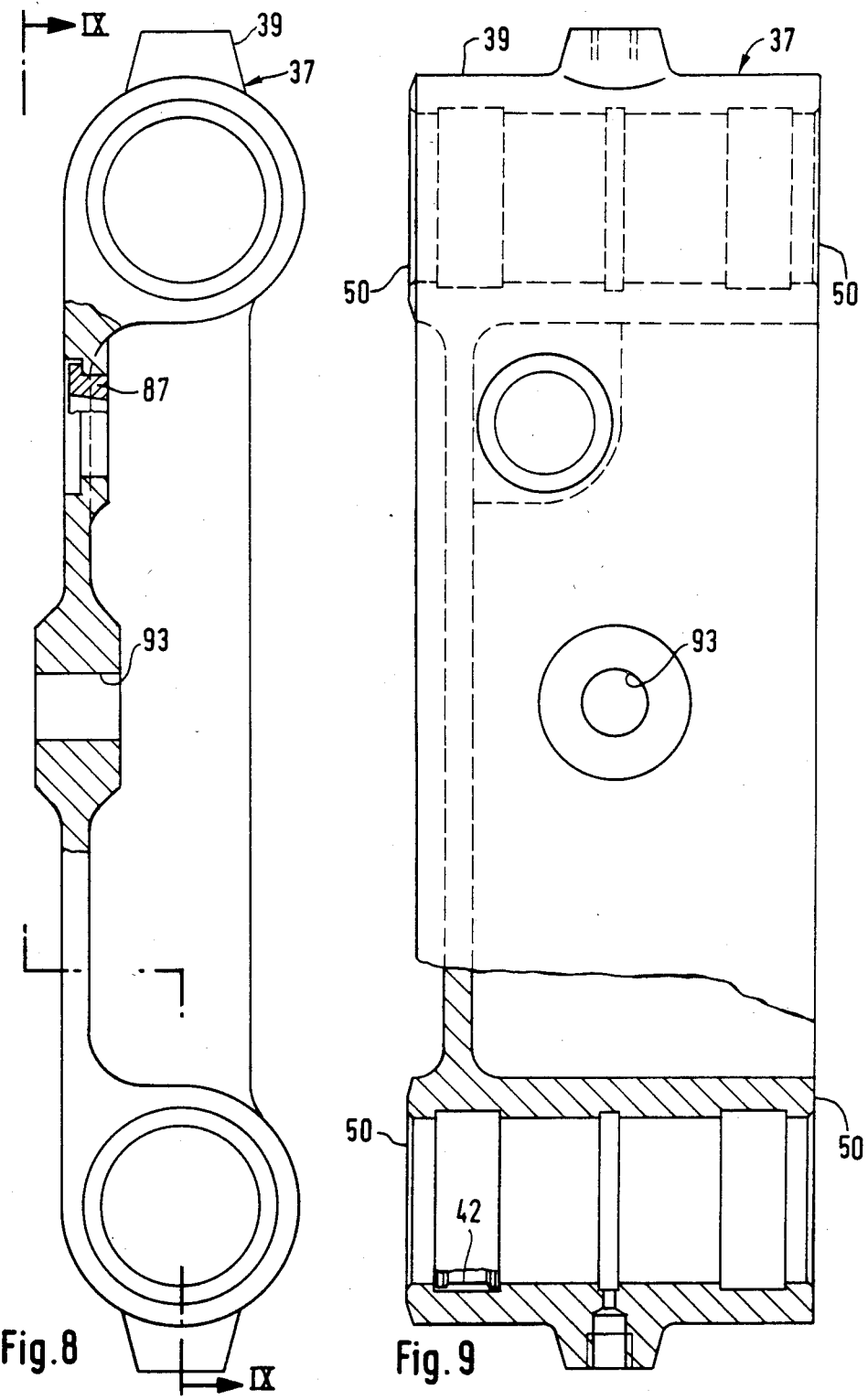
FIG. 8 is a partially sectioned side view of a carriage.
FIG. 9 is a partially sectioned front view taken along the line 9—9 in FIG. 8.
Figure 10:
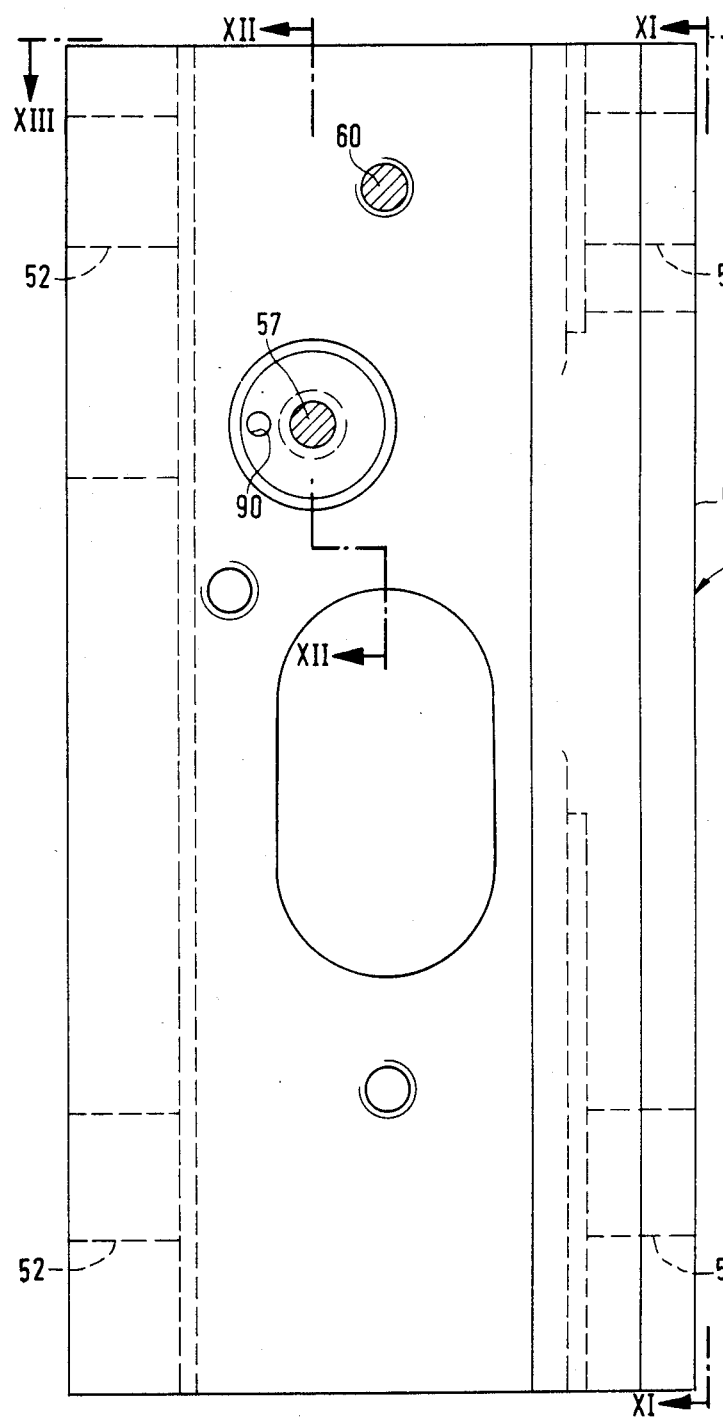
FIG. 10 is a view showing a coupling part of a holding element for holding the neck mold.

As can be seen from FIG. 6 each pin 35 is guided with a part of smaller diameter in an opening 93 of the carriage 36 and fixed therein by a nut 94. FIG. 7 shows that the guide ring 6 engages with an outer annular flange 95 in a respective annular groove 96 of the neck ring halves 4 and 5 with play in circumferential direction and in axial direction. FIGS. 8 and 9 show details of the frame 39 of the carriage 37. FIGS. 10–13 show details of the coupling part 54 of the holding element 56.

Figure 14:
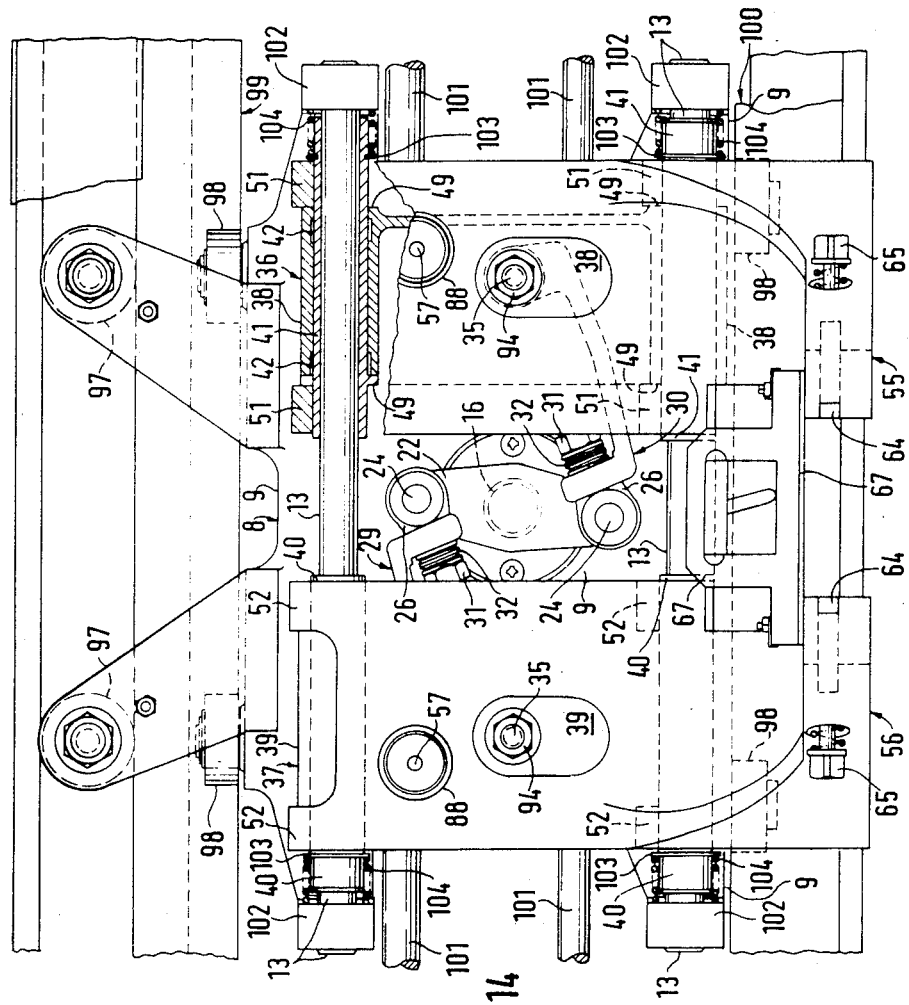
FIG. 14 is a partially sectioned view of another embodiment of the transport unit of the present invention.

FIG. 14 shows another embodiment of the present invention, wherein parts which are identical with the parts of the first embodiment are identified by identical reference numerals. The transport element 8 in FIG. 14 is formed as a wagon which runs with supporting rollers 97 and guiding rollers 98 in an upper rail 99 and a lower rail 100. The transport element 8 is a component of a transporting chain for neck molds of the machine which is, for example, shown and described in the abovementioned German Pat. No. 1,596,472. Two pulling bars 101 are pivotally mounted at each side of the frame 9 and serve as connecting elements to neighboring members of the transporting chain. The transport elements 8 must not move along a circular path as in the first described embodiment. The path of movement can assume any desirable shape.

The frame 9 has four supports 102 in which one end of the guiding bars 13 is held. In contrast to the first described embodiment, it serves here for outer support of the guide bars 13. A closing spring 104 formed as a pressure spring is arranged between each support 102 and a support ring 103 of the guide bushes 40, 41. The closing spring 104 prestresses the associated carriages 36, 37 to their closed position.

FIG. 14 shows the holding elements 55 and 56 in their fully open position. The holding elements 55 and 56 are formed in this embodiment of one piece and are not composed of a coupling part and a holding part, contrary to the first described embodiment. This integral construction of the holding elements 55 and 56 is recommended when in single job operation only one neck mold is arranged in the transport element 8. It is also recommended when in multiple job operation several neck molds are arranged in transport element 8 and the basic strength of the material for the holding elements 55 and 56 is selected sufficiently high.

It will be understood that each of the elements described above, or two or more together, may also find a useful application in other types of constructions differing from the types described above.

While the invention has been illustrated and described as embodied in a transport unit of a machine for forming hollow articles of vitreous material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A machine for forming a hollow article of vitreous material, comprising at least one forming means having a neck ring including a pair of separable neck ring halves; holding means for holding said at least one forming means and including a pair of holding elements each holding a respective one of said neck ring halves; transporting means for transporting said forming means along a predetermined path and having guide bars; carriages displaceably mounted on said guide bars of said transporting means, each of said holding elements for holding a respective one of said neck ring halves being releasably connected with one of said carriages so that said holding elements can be removed from any hung on said carriages, each of said holding elements being provided with at least one hook and suspended by said at least one hook on the respective one of said carriages; driving means connected with said carriages for moving each of said holding elements relative to said guide bars of said transporting means, between closed and open end positions; and locking means connected with said carriages for locking each of said holding elements in at least said closed end position.

2. A machine as defined in claim 1, wherein each of said holding elements is provided with a position determining means and fixed via said position determining means relative to the respective one of said carriages.

3. A machine as defined in claim 2, wherein said position determining means includes axial abutment shoulders formed on said carriages, and locking pins located between said holding elements and said carriages.

4. A machine as defined in claim 1, wherein said transporting means has a transport element provided with support means, said guide bars being supported in a central region of their length on said support means.

5. A machine as defined in claim 1, wherein each of said carriages is provided with guide bushes and slides with one of said guide bushes on a respective one of said guide bars.

6. A machine as defined in claim 1; and further comprising spring means including at least one closing spring which urges each of said carriages to a position for closing said at least one neck ring.

7. A machine as defined in claim 6, wherein said transporting means has a transport element provided with a support, each of said closing springs being arranged between said support of said transport element and an adjacent one of said carriages.

8. A machine as defined in claim 7, wherein each of said closing springs is arranged concentrically with a respective one of said guide bars.

9. A machine as defined in claim 6, wherein each of said guide bars is tubular and has an inner hollow receiving a respective one of said closing springs, each of said closing springs being connected to an outer end of each of said carriages.

10. A machine as defined in claim 1, wherein said transporting means has a transport element, said driving means including a shaft supported in said transport element and having an axis and two axial end portions, a lever mounted on one end portion of said shaft and supporting only one drive roller which is actuated by a raisable and lowerable curved piece, a switch plate mounted on the other end portion of said shaft and having two switch pins which are symmetrical relative to said shaft axis, and a rigid U-shaped bracket which is pivotally connected with each switch pin and with a respective one of said carriages with interposition of a spring element, said brackets having arms which face toward one another and are telescopable in one another.

11. A machine as defined in claim 10; and further comprising a lifting mechanism arranged to raise and lower said curved piece.

12. A machine as defined in claim 10, wherein each of said spring elements has a pin extending through a respective one of said brackets and having an eye supported on a respective one of said switch pins, and a spring member located between each of said pins and said brackets and loading the latter with pulling force.

* * * * *